United States Patent
Brunner et al.

(10) Patent No.: US 10,523,795 B2
(45) Date of Patent: Dec. 31, 2019

(54) SMALL FORM-FACTOR PLUGGABLE MODULE

(71) Applicant: TELEFONAKTIEBOLAGET L M ERICSSON (PUBL), Stockholm (SE)

(72) Inventors: Robert Brunner, Montreal (CA); Richard Joseph Brunner, Montreal (CA); Sergey Slovetskiy, Bellevue, WA (US); Stephane Lessard, Mirabel (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 105 days.

(21) Appl. No.: 14/648,842

(22) PCT Filed: May 22, 2015

(86) PCT No.: PCT/IB2015/053803
§ 371 (c)(1),
(2) Date: Jun. 1, 2015

(87) PCT Pub. No.: WO2016/189349
PCT Pub. Date: Dec. 1, 2016

(65) Prior Publication Data
US 2017/0223151 A1    Aug. 3, 2017

(51) Int. Cl.
*H04L 29/06*     (2006.01)
*H04L 12/741*    (2013.01)

(52) U.S. Cl.
CPC .............. *H04L 69/22* (2013.01); *H04L 45/74* (2013.01)

(58) Field of Classification Search
CPC ................................ H04L 69/22; H04L 45/74
See application file for complete search history.

(56) References Cited

U.S. PATENT DOCUMENTS

| | | |
|---|---|---|
| 8,462,838 B2 | 6/2013 | Chen et al. |
| 8,641,429 B2 | 2/2014 | Fish et al. |
| 8,830,869 B2 | 9/2014 | Robitaille et al. |
| 8,851,929 B2 | 10/2014 | Sorani |
| 9,549,234 B1 * | 1/2017 | Mascitto ............ H04Q 11/0071 |
| 2010/0098252 A1 | 4/2010 | Kanter et al. |
| 2012/0210416 A1 | 8/2012 | Mihelich et al. |
| 2013/0077968 A1 | 3/2013 | Yang |

(Continued)

OTHER PUBLICATIONS

Network Working Group; RFC 792; Sep. 1981; p. 14.*

(Continued)

*Primary Examiner* — Ricky Q Ngo
*Assistant Examiner* — Stephen N Steiner
(74) *Attorney, Agent, or Firm* — Christopher & Weisberg, P.A.

(57) ABSTRACT

A small form-factor pluggable (SFP) module and related method are provided to perform additional packet processing in a communication network. The SFP module is generally configured to at least partially process data packets as they transit from a first networking equipment toward a second networking equipment in order to modify or otherwise update header information of the packets as a function of the content of their data payload. Modifying header information of data packets as they transit between interconnected networking equipments allows interconnected networking equipments to perform packet processing on the modified header information.

21 Claims, 14 Drawing Sheets

(56) References Cited

U.S. PATENT DOCUMENTS

| | | |
|---|---|---|
| 2014/0024255 A1 | 1/2014 | Robitaille et al. |
| 2014/0025790 A1 | 1/2014 | Robitaille et al. |
| 2014/0169785 A1 | 6/2014 | Roullot |
| 2014/0237116 A1 | 8/2014 | Robitaille et al. |
| 2014/0269716 A1* | 9/2014 | Pruss ............... H04L 45/38 370/392 |
| 2014/0351454 A1 | 11/2014 | Robitaille et al. |
| 2014/0355986 A1 | 12/2014 | Trojer et al. |
| 2014/0379939 A1 | 12/2014 | Robitaille et al. |
| 2015/0200827 A1* | 7/2015 | Agarwal ............ G06F 11/079 714/37 |

OTHER PUBLICATIONS

Ren Wang et al.: "DirectPath: High performance and energy efficient platform I/O architecture for content intensive usages"; May 9, 2012; XP032189067; 10 pages.

International Search Report for PCT/IB2015/053803, dated Feb. 10, 2016; 12 pages.

* cited by examiner

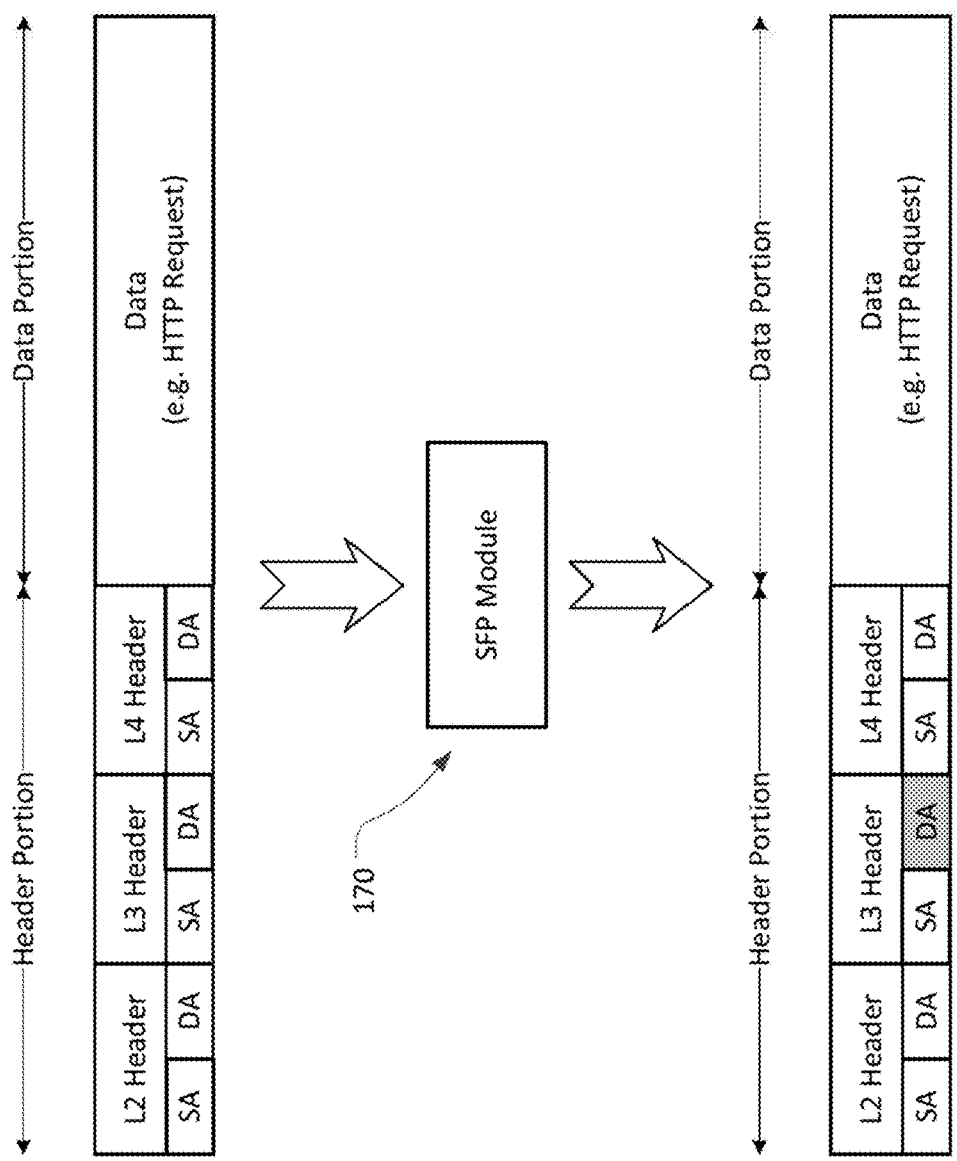

| | Matching Patterns | | | | | | | Mapping | |
|---|---|---|---|---|---|---|---|---|---|
| In/Out | MAC-DA | MAC-SA | VLAN1 | VLAN2 | IP-DA:Port | IP-SA:Port | Protocol | String | Type | Alias |
| Ingress | * | * | * | * | *:80 | *:* | HTTP | GET | Forward/Add | 192.168.4.10:8080 |
| Egress | * | * | * | * | *:* | 192.168.4.10:* | * | * | Reverse/Strip | |
| Ingress | * | * | <5001 | * | *:8080 | *:* | HTTP | POST | Forward/Map | VLAN+5000 |
| Egress | * | * | >5001 | * | *:* | *:* | * | * | Reverse/Map | VLAN-5000 |
| Default | * | * | * | * | *:* | *:* | * | * | None | |

SMALL FORM-FACTOR PLUGGABLE MODULE

TECHNICAL FIELD

The present invention generally relates to small form-factor pluggable (SFP) modules and transceivers and more particularly relates to SFP modules and transceivers with enhanced functionalities.

BACKGROUND

Over the years, network operators have deployed a significant amount of networking equipments in order to address an increasing array of data services, including videoconferencing, video streaming, online gaming, etc. In order to manage and process the exponential amount of data traffic generated by some of these new services, smart and more powerful networking equipments have been developed and gradually deployed in existing data networks.

However, from the point of view of network operators, replacing all the existing and already deployed networking equipments is prohibitively expensive. It is thus generally desired to extend as much as possible the life of legacy networking equipments remaining in data networks.

Still, maintaining legacy networking equipments is often difficult as most of these equipments are neither configured nor readily adapted to be upgraded to perform more advanced functions. Whether these legacy equipments are upgraded with new software or new hardware, they generally remain limited to the basic packet processing functions for which they were initially designed.

Therefore, it would be desirable to provide devices and methods that obviate or mitigate the above described problems.

SUMMARY

In many telecommunication networks, various networking equipments are interconnected by communication links which can be either electrical (i.e. the data are transported as electrical signals) or optical (i.e. the data are transported as optical signals). These communication links are typically interfaced by small form-factor pluggable (SFP) modules or transceivers plugged into the networking equipments. A SFP module is generally configured to convert data it receives from the networking equipment into which it is plugged into a form appropriate for the communication link it interfaces, and then to transmit the converted data to the SFP module plugged into the next or receiving networking equipment over the communication link. Conversely, the SFP module is also generally configured to convert data it receives from the communication link it interfaces into a form appropriate for the networking equipment into which it is plugged, and then to transmit the converted data to the networking equipment.

In accordance with the principles of the present invention, a SFP module configured to perform additional packet processing between interconnected networking equipments is provided. In accordance with a broad aspect, the SFP module is configured to at least partially process data packets as they transit from a sending networking equipment toward a receiving networking equipment in order to selectively modify or otherwise update header information of the packets as a function of the content of their data payload. Updating header information of data packets as they transit between interconnected networking equipments allows the receiving networking equipments to perform their basic packet processing, mainly switching and routing, on the modified or otherwise updated header information.

In a first exemplary embodiment in accordance with the principles of the present invention, a method of operating a SFP module configured to process data packets as they transit from a first networking equipment to a second networking equipment, is provided. The method generally comprises receiving data packets from the first networking equipment, processing the data packets, and forwarding the processed data packets to the second networking equipment. Data packets to be processed by the SFP module generally comprise a header portion and a data portion (sometimes referred to as data payload). The header portion of the data packets generally comprises addressing information which is used by the networking equipments in the network to properly switch and/or route the data packets to their intended destination. The header portion may also comprise additional information related to the data packet (e.g. size, length, version, protocol, type, etc.). Processing a data packet may comprise inspecting at least part of the data portion of the data packet, and selectively modifying the header portion of the data packet in response to inspecting part of the data portion.

In some embodiments, inspecting part of the data portion of the data packet may further comprise detecting predetermined information from the inspected part of the data portion of the data packet. In such embodiments, selectively modifying the header portion of the data packet may further be performed as a function of the detected predetermined information. Notably, different information may trigger different modifications to the header portion of the data packet.

In some embodiments, selectively modifying the header portion of the data packet may comprise selectively modifying addressing information comprised in the header portion. In such embodiments, selectively modifying the addressing information may be done in a reversible manner via, for instance, a mapping table and/or a mathematical relation. In some embodiments, selectively modifying the addressing information may comprise selectively modifying a destination address comprised in the addressing information.

In some embodiments, the header portion of the data packet may comprise a plurality of headers. Such embodiments may occur when the data portion of the data packet has been encapsulated several times with different headers generally compliant with different communication protocols. In such embodiments, selectively modifying the header portion of the data packet may comprise selectively modifying at least one of the plurality of headers. Additionally or alternatively, selectively modifying the header portion of the data packet may comprise inserting at least one additional header to the plurality of headers.

In some embodiments, selectively modifying at least one of the plurality of headers may comprise selectively modifying a destination address of at least one of the plurality of headers. Additionally or alternatively, selectively modifying at least one of the plurality of headers may comprise inserting at least one additional header or tag within at least one of the plurality of headers.

In a second exemplary embodiment in accordance with the principles of the present invention, a SFP module configured to perform one or more of the SFP module functionalities described herein may comprise a first communication interface configured to communicate (e.g. receive and/or transmit data packets) with a first networking equipment, and a second communication interface configured to interface (e.g. receive and/or transmit data packets) a communication link. The SFP module may also comprise circuitry operatively connected to the first and second communication interfaces, the circuitry being configured to perform one or more of the SFP module functionalities described herein.

In some embodiments, the circuitry may comprise a processor and a memory having stored therein computer-readable instructions which when executed by the processor, allow the SFP module to perform one or more of the SFP module functionalities described herein. In some embodiments, the processor may be implemented as general purpose processing circuitry (e.g. processor, microprocessor, central processing unit, microcontroller, etc.), special purpose processing circuitry (e.g. application specific integrated circuits (ASIC), field programmable gate arrays (FPGA), etc.), or as a combination of both.

In some embodiments, the first communication interface may comprise a SFP-compliant electrical transceiver configured to mate with a corresponding SFP-compliant electrical connector located on the first networking equipment, and the second communication interface may comprise either an electrical or an optical transceiver configured to interface either a corresponding electrical communication link or an optical communication link.

In a third exemplary embodiment in accordance with the principles of the present invention, a SFP module configured to perform one or more of the SFP module functionalities described herein may comprise a networking equipment interfacing module configured to interface a networking equipment, a data packet inspecting module configured to inspect at least part of the data portion of the data packet, a data packet header modifying module configured to selectively modify the header portion of the data packet in response to the inspection of at least part of the data portion of the data packet by the data packet inspecting module, and a communication link interfacing module configured to interface a communication link.

In some embodiments, the networking equipment interfacing module may be configured to receive data packets from the networking equipment and to transmit data packet to the networking equipment.

In some embodiments, the communication link interfacing module may be configured to receive data packets from the communication link and to transmit data packet over the communication link.

In some embodiments, the data packet inspecting module and the data packet header modifying module may be sub-modules of a packet processing module.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached figures, wherein:

FIGS. 5A to 5H illustrate schematic diagrams of various modifications to the header portions of data packets in accordance with the principles of the present invention.

FIG. 6 illustrates an exemplary embodiment of a mapping table.

DETAILED DESCRIPTION

Reference may be made below to specific elements, numbered in accordance with the attached figures. The discussion below should be taken to be exemplary in nature, and not as limiting of the scope of the present invention. The scope of the present invention is defined in the claims, and should not be considered as limited by the implementation details described below, which as one skilled in the art will appreciate, can be modified by replacing elements with equivalent functional elements.

Figure 1:
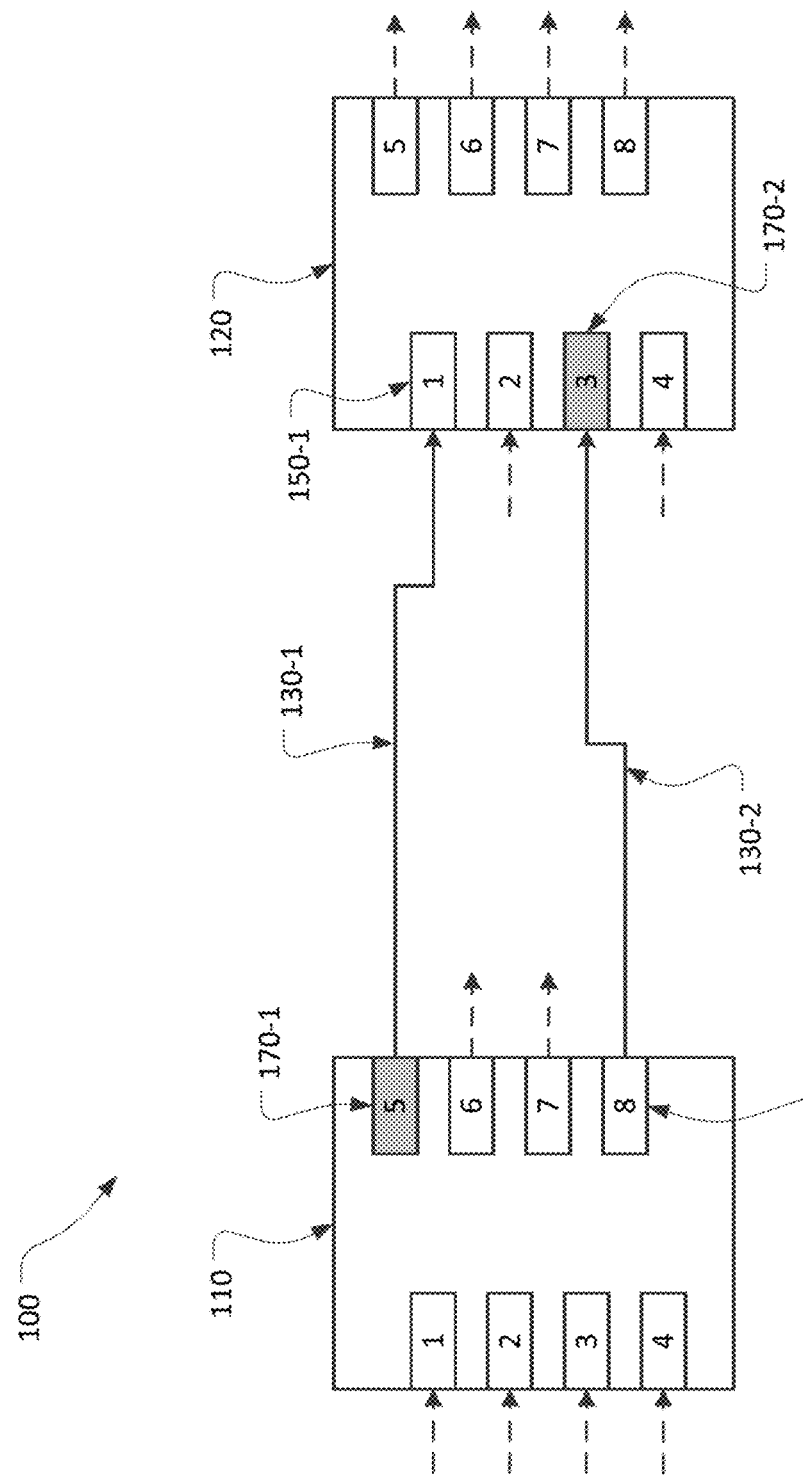
FIG. 1 illustrates a portion of an exemplary communication network.

Referring first to FIG. 1, a portion of an exemplary communication network 100 in which a SFP module in accordance with the principles of the present invention can be deployed is illustrated. The illustrated portion of the communication network 100 comprises a pair of networking equipments 110 and 120 (e.g. routers, switches, servers, etc.) interconnected by one or more communication links 130. Each of the communication links 130 can be an electrical communication link or an optical communication link. To allow networking equipments 110, 120 from different vendors to be interconnected properly using different communication links such as communication links 130, each of the communication links 130 is interfaced, at each of its extremities, by small form-factor pluggable (SFP) transceivers or modules 150, 170. SFP modules 150, 170 are transceivers with generally standardized form factors which provide the necessary interfaces between the networking equipments 110, 120 and the communication link 130 (e.g. electrical or optical) interconnecting them.

Conventional SFP modules such as SFP modules 150 are generally limited to converting the data packets they receive from the networking equipments 110, 120 to which they are connected into physical signals appropriate for the communication link 130, and vice versa. Hence, conventional SFP modules 150 are typically not configured to further process the data packets transiting through them. Consequently, when a data packet exits a networking equipment such as networking equipment 110 and goes through the SFP module 150, the data packet will be simply converted to be transmitted over the communication link 130. Similarly, when a data packet arrives at a SFP module 150 via a communication link 130, the SFP 150 will convert the data packet back into electrical signals appropriate for the networking equipment before forwarding the data packet to the networking equipment.

Current communication network deployments often comprise many legacy networking equipments such as networking equipments 110, 120 which are capable of performing the tasks for which they were initially designed (e.g. switching, routing, etc.). However, due to their physical configurations, such legacy networking equipments 110, 120 cannot be easily updated, either through hardware upgrade or through software upgrade such as to be able to perform more advanced packet processing. And replacing these legacy networking equipments 110, 120 would involve spending significant sums.

In such context, embodiments of a smart SFP module 170 in accordance with the principles of the present invention are configured to perform additional packet processing in addition to their basic transceiver functions. Such additional packet processing may comprise inspecting at least part of the data portion of a received data packet, and responsive to the inspection of at least part of the data portion of the data packet, selectively modifying the header portion of the data packet before further transmitting the modified data packet. This additional processing of the data packets, and more particularly of the header portion of the data packets, allow, among other things, legacy networking equipments 110, 120 to perform their intended networking operations (e.g. switching, routing, etc.) on the modified or otherwise updated data packets. As such, the smart SFP modules 170 may extend the operational longevity of legacy networking equipments 110, 120 by providing additional packet processing capabilities to the network 100.

Referring back to FIG. 1, when a smart SFP module 170 plugged into a network port of a first networking equipment, e.g. smart SFP module 170-1 plugged into network port 5 of networking equipment 110, receives a stream of data packets outputted by the networking equipment 110, the smart SFP module 170-1 parses the data packets and inspects at least part of the data portion of each incoming data packet. Depending on the actual content of the inspected part of the data portion of the data packet, the smart SFP module 170-1 selectively modifies the header portion of the data packet. Notably, not all the data packets may need to have their header portion modified. In that sense, the smart SFP module 170 may decide not to modify the header portion of some data packets if the content of the inspected part of their data portion does not warrant any modification.

The smart SFP module 170-1 then transmits the data packets over the communication link 130-1. Notably, the transmitted stream of data packets now comprises data packets with unmodified header portions, and data packets with modified header portions.

As the stream of data packets reaches the conventional SFP module 150-1 plugged into network port 1 of the second networking equipment 120, the SFP module 150-1 converts the received data packets into a format appropriate for the networking equipment 120 and transmits the data packets to the second networking equipment 120.

The second networking equipment 120 then processes the received data packets. Notably, since the second networking equipment 120 is unaware that some data packets have had their header portion modified by the smart SFP module 170-1 plugged into the first networking equipment 110, the second networking equipment 120 blindly processes the received data packets according to the information contained in their header portion. Hence, the second networking equipment 120 may switch or route some of the received data packets to output ports which are different than if the header portions of these data packets had not been modified. Therefore, how data packets with modified header portions will be processed by the second networking equipment 120 will depend on the capabilities (e.g. switching, routing, etc.) of the second networking equipment 120. For instance, if the second networking equipment 120 is a router, the router will route the received data packets using its internal routing table and according to the information comprised in respective header portions of the received data packets, whether or not the header portion has been modified by a smart SFP module 170.

Though the above example has been described with the smart SFP module 170-1 being plugged into the first networking equipment 110 and the conventional SFP module 150-1 being plugged into the second networking equipment 120, the position of the smart SFP module 170 and the conventional SFP module 150 could be inverted (e.g. conventional SFP module 150-2 and smart SFP module 170-2). In that regard, it is to be understood that SFP modules such as conventional SFP modules 150 and smart SFP modules 170 are generally bidirectional in that they can both transmit and receive data packets over the communication link 130 they interface.

In the communication network 100 illustrated in FIG. 1, even if both the first networking equipment 110 and the second networking equipment 120 are legacy networking equipments which may have limitations with respect to the extent of packet processing they can perform, having a smart SFP module 170 connected to one of them can extend the service life of these equipments by performing additional and possibly more advanced packet processing. Understandably, each additional smart SFP module 170 deployed into a communication network such as communication network 100 adds further packet processing capabilities to the network. As such, having a federation of smart SFP modules 170 deployed throughout a communication network such as communication network 100 comprising many interconnected legacy networking equipments 110, 120 may further extend the service life of these legacy networking equipments as a significant amount of packet processing may be offloaded to the federation of smart SFP modules 170. Furthermore, smart SFP modules 170 may be configured differently such as to perform specific packet processing between given pairs of networking equipments.

Figure 2:
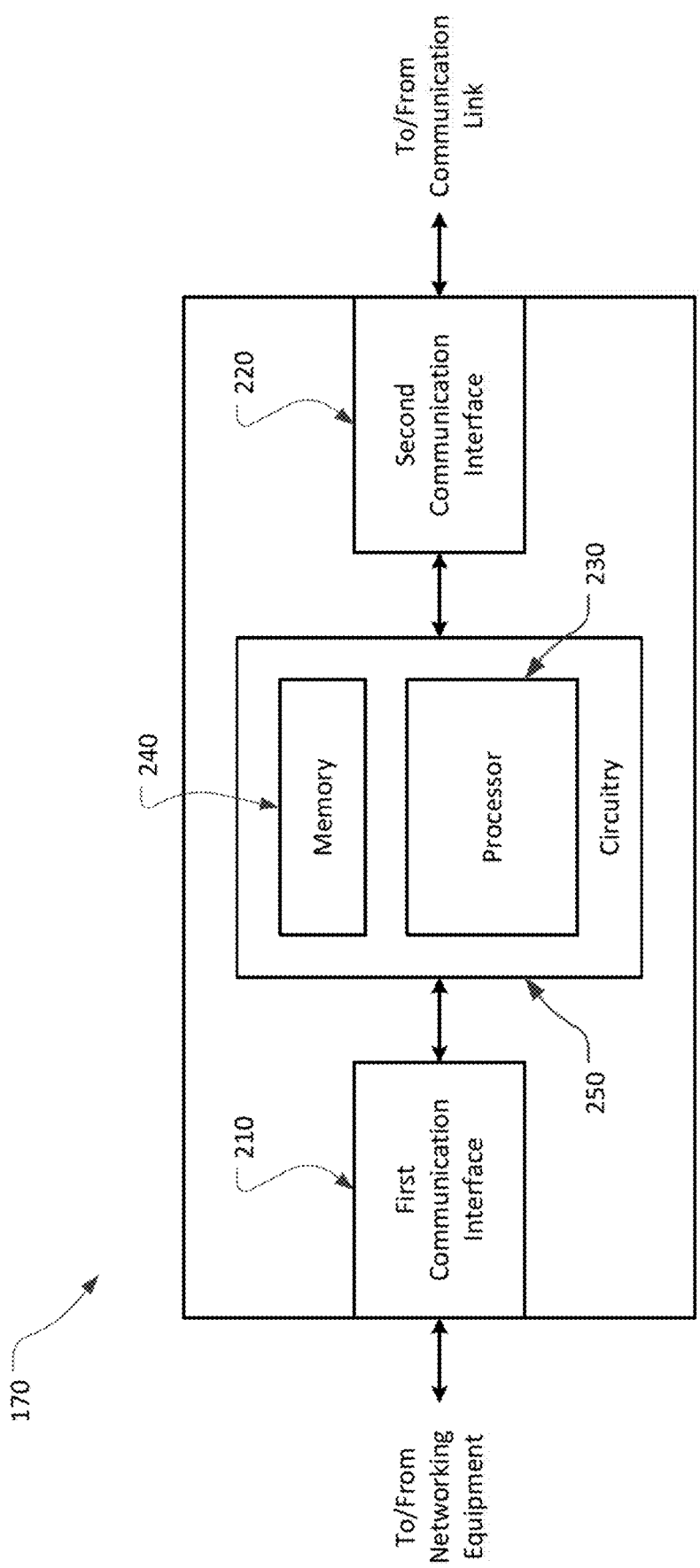
FIG. 2 illustrates a block diagram of an embodiment of a SFP module in accordance with the principles of the present invention.

Turning now to FIG. 2, a functional block diagram of an embodiment of smart SFP module 170 in accordance with the principles of the present invention is illustrated.

Smart SFP module 170 may comprise a first communication interface 210, a second communication interface 220, a processor 230 operatively connected to both communication interfaces 210 and 220, and a memory 240 operatively connected to the processor 230.

In the present embodiment, since the smart SFP module 170 is configured as a small form-factor pluggable module, it is generally physically configured to be pluggable into an SFP-compliant cage or port located on a networking equipment such as networking equipment 110 or 120. As such, the first communication interface 210 may be physically and electrically configured as a SFP-compliant communication interface while the second communication interface 220 may comprise either an optical transceiver or an electrical transceiver depending on the type of communication link 130 the smart SFP module 170 is configured to interface.

It will be appreciated that the expression small form-factor pluggable (SFP) as used herein is generic and therefore encompasses all the different configurations of small form-factor pluggable transceivers and modules. These different configurations of SFP transceivers include, but are not limited to, SFP, QSFP, SFP+, CFP, CFP2, CXP, XFP, X2, XPAK, XENPAK, etc.

Processor 230 provides overall operational control for smart SFP module 170 and processes packets according to instructions stored in memory 240. In some embodiments, the processor may be implemented as general purpose processing circuitry (e.g. processor, microprocessor, central processing unit, microcontroller, etc.), special purpose processing circuitry (e.g. application specific integrated circuits (ASIC), field programmable gate arrays (FPGA), etc.), or as a combination of both. For its part, memory 240 provides storage for instruction and data (e.g. mapping table). Memory 240 may be integrated with the processor 230 as part of circuitry 250, or may be implemented in one or more discrete memory devices or units.

Figure 3:
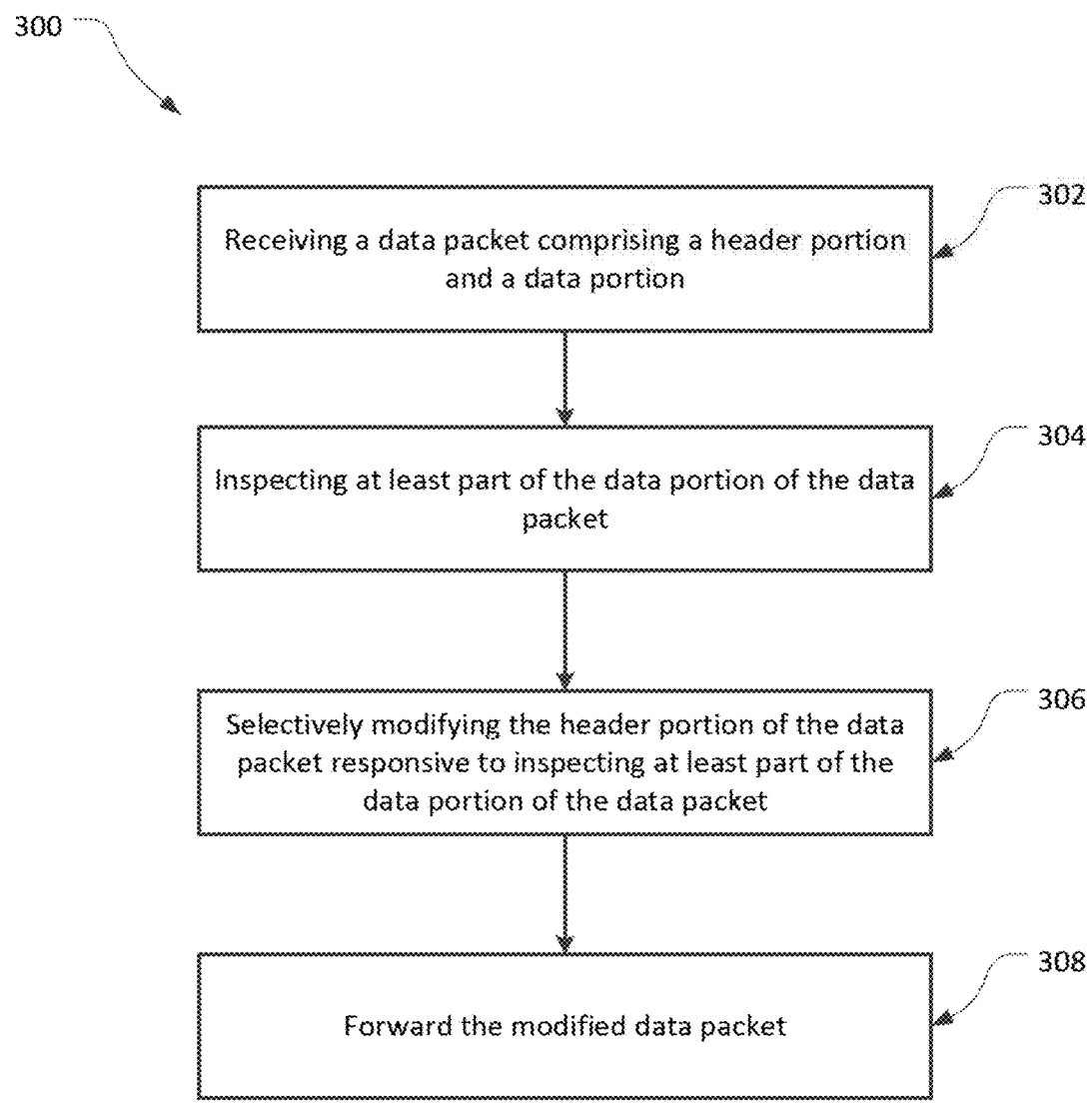
FIG. 3 illustrates an exemplary flowchart of a method in accordance with the principles of the present invention.

Referring now to FIG. 3, an embodiment of a method that may be performed by the smart SFP module 170 is generally illustrated at 300.

The method generally starts with the smart SFP module 170 receiving a data packet, part of a stream of data packets, from a first networking equipment, the data packet comprising a header portion and a data portion (sometimes referred to as payload) (step 302). The header portion of the data packet generally comprises addressing information which is used by networking equipments such as networking equipments 110 and 120 to switch or route the data packet toward the right destination.

The smart SFP module 170 then inspects at least part of the data portion of the received data packet (step 304). Inspecting of at least part of the data portion of the received data packet is generally performed in order to detect or otherwise retrieve information from the data portion of the data packet which can then be used by the smart SFP module 170 to ascertain where the data packet should be sent. Depending on the actual content of the data portion of the data packet, the detected or retrieved information may comprise a target resource address, particular strings of characters (e.g. particular words), a service identifier, etc.

Once the smart SFP module 170 has inspected at least part of the data portion of the data packet, the smart SFP module 170 may selectively modify, in response to the inspection, the header portion of the data packet (step 306). Understandably, the modified header portion of the data packet will generally be used by the second networking equipment for switching or routing purposes.

The smart SFP module 170 then forwards the modified data packet to the second networking equipment (step 308).

Notably, if the smart SFP module 170 is plugged into the first networking equipment, receiving the data packet from the first networking equipment may comprise directly receiving the data packet from the first networking equipment, while forwarding the modified data packet to the second networking equipment may comprise converting the modified data packet into a format compliant with the communication link 130 interconnecting the first and second networking equipments, and transmitting the modified data packet over the communication link 130. Conversely, if the smart SFP module 170 is plugged into the second networking equipment, receiving the data packet from the first networking equipment may comprise converting the received data packet into a format compliant with the smart SFP module 170, and forwarding the modified data packet to the second networking equipment may comprise directly transmitting the modified data packet to the second networking equipment.

Figure 4:
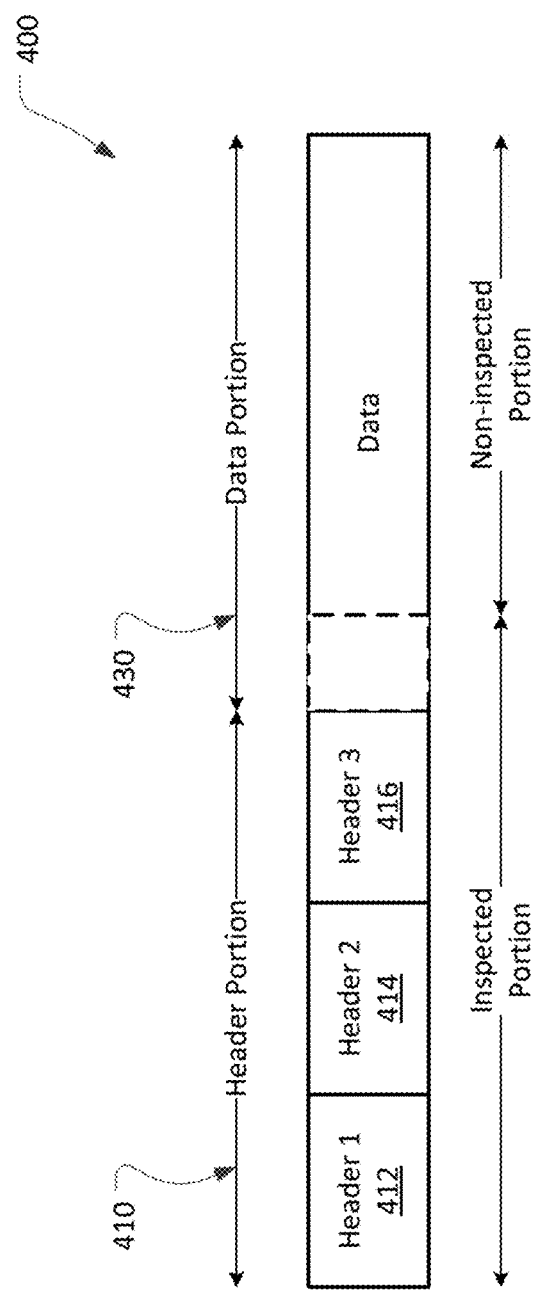
FIG. 4 illustrates a schematic diagram of an exemplary data packet.

Referring now to FIG. 4, an example of a data packet that can be processed by the smart SFP module 170 is shown schematically at 400. Data packet 400 generally comprises a header portion 410 and a data portion 430 (sometimes referred to as payload). As illustrated in FIG. 4, the header portion 410 of the data packet 400 may comprise one or more headers 412, 414, 416, each of which being compliant with a particular networking protocol (e.g. Ethernet, Internet Protocol, Transmission Control Protocol, User Datagram Protocol, etc.). Notably, a data packet can have multiple headers when the data it carries has been encapsulated by several protocols.

Though each header of the header portion 410 may comprise different information, they generally each comprise at least addressing information (e.g. source address/port (SA), destination address/port (DA)) in order for the data packet to be properly switched and routed to its intended destination.

The data portion generally comprises the information that needs to be carried to a given destination in the communication network.

In some embodiments, the information needed by the smart SFP module 170 to selectively modify the header portion of the data packet is located at the beginning of the data portion as illustrated in FIG. 4. In such embodiments, the smart SFP module 170 does not need to inspect all the data portion of the packet to decide to selectively modify the header portion. This partial inspection of the data portion of the data packet may allow the smart SFP module 170 to perform its packet processing almost at wireline speed. For instance, in some non-limiting embodiments, the smart SFP module 170 may be able to decide whether or not it needs to modify the header portion of the data packet after having inspected only about the first 150 bytes of the data packet that may be up to 65,535 bytes in length (i.e. a typical Internet Protocol (IP) packet).

FIGS. 5A to 5H illustrate various examples of header modifications that the smart SFP module 170 can perform as a function of the inspection of part of the data portion of the data packet. In these various examples, the header portion of the data packet comprises three headers, a layer 2 (L2) header, a layer 3 (L3) header, and a layer 4 (L4) header. In some embodiments, a L2 header may represent an Ethernet header, a L3 header may represent an Internet Protocol UP) header, and a L4 header may represent a Transmission Control Protocol (TCP) header or a User Datagram Protocol (UDP) header. It will be appreciated that a data packet may have more or less than three headers in its header portion.

Figure 5A:
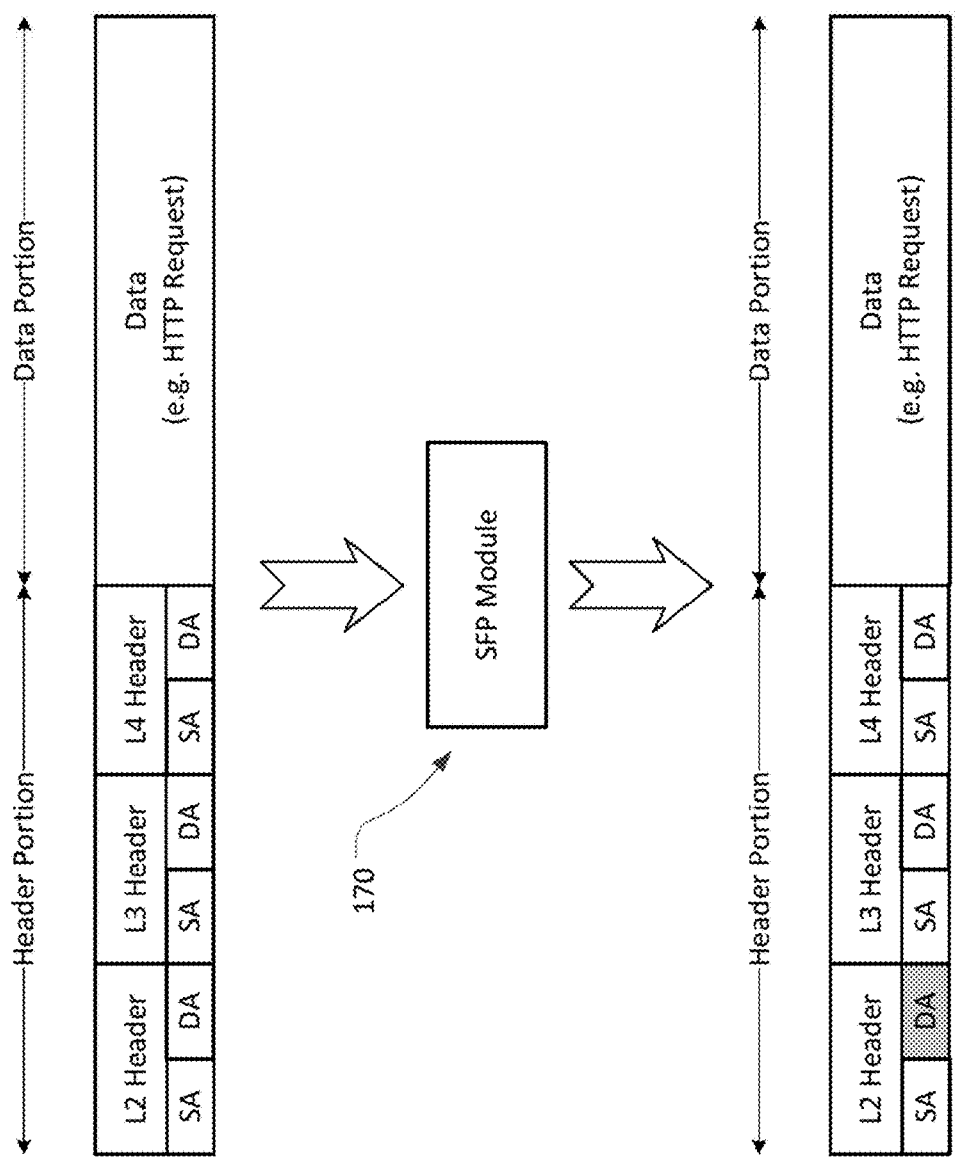

In FIG. 5A, upon inspecting part of the data portion of the data packet, the smart SFP module 170 modifies the destination address (DA) (e.g. destination MAC address) of the L2 header (e.g. Ethernet header) comprised in the header portion of the data packet. Such a modification may change the output port to which the data packet will be switched or routed at the receiving networking equipment.

Figure 5B:
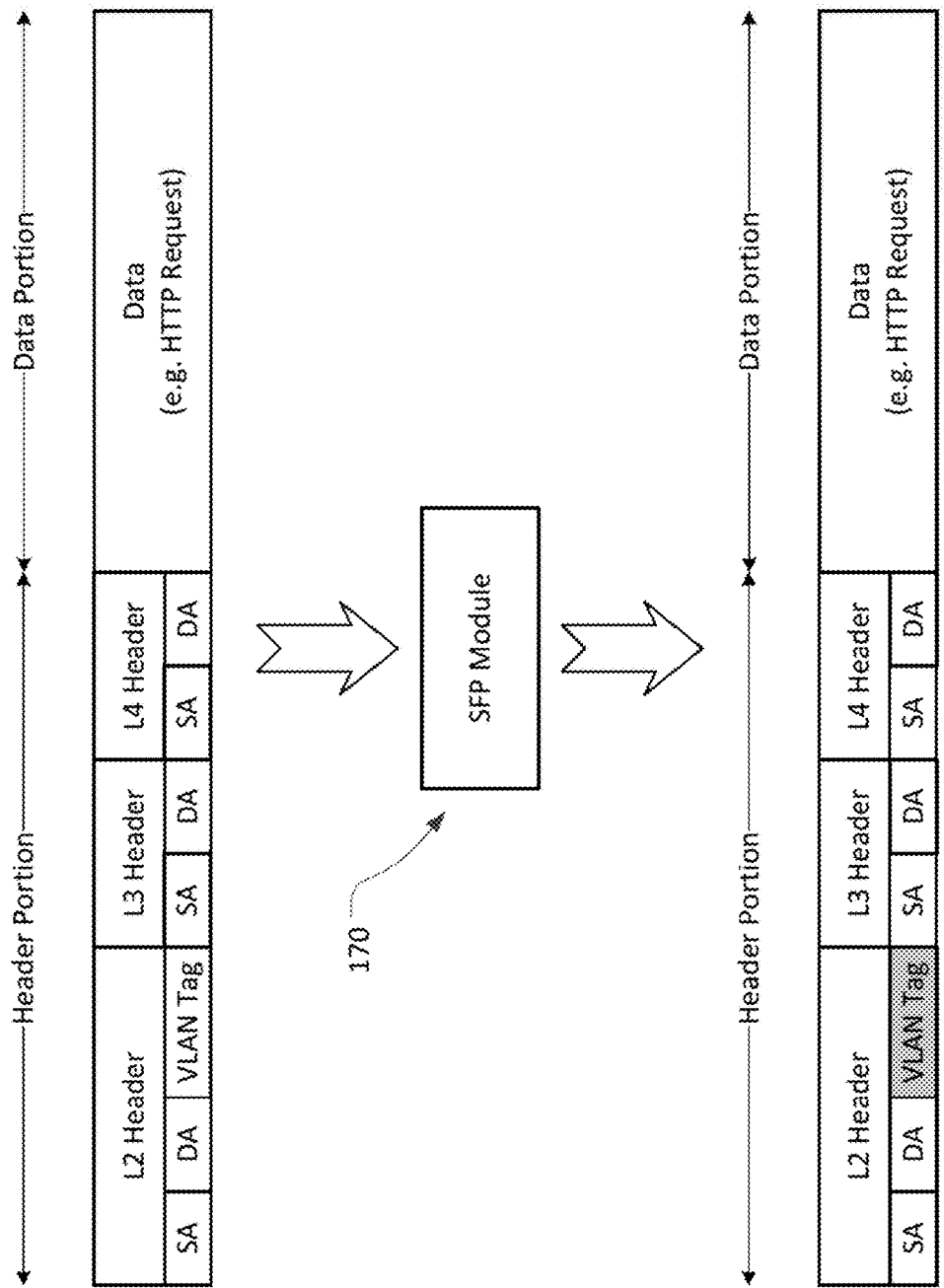

In FIG. 5B, the L2 header (e.g. Ethernet header) further comprises a virtual local area network (VLAN) tag. Upon inspecting part of the data portion of the data packet, the smart SFP module 170 modifies the VLAN tag comprised in the L2 header comprised in the header portion of the data packet. Modifying an existing VLAN tag in a L2 header may involve modifying the identification of the VLAN with a different identification such that the data packet is sent to a different VLAN.

In FIG. 5C, the data packet is similar to the data packet shown in FIG. 5A. However, in this case, upon inspecting part of the data portion of the data packet, the smart SFP module 170 modifies the destination address (DA) (e.g. IP destination address) of the L3 header (e.g. IP header) comprised in the header portion of the data packet. Modifying the destination address of a L3 header may cause the data packet to be sent to a different equipment altogether as L3 addressing information is generally unique to a given equipment.

Figure 5D:
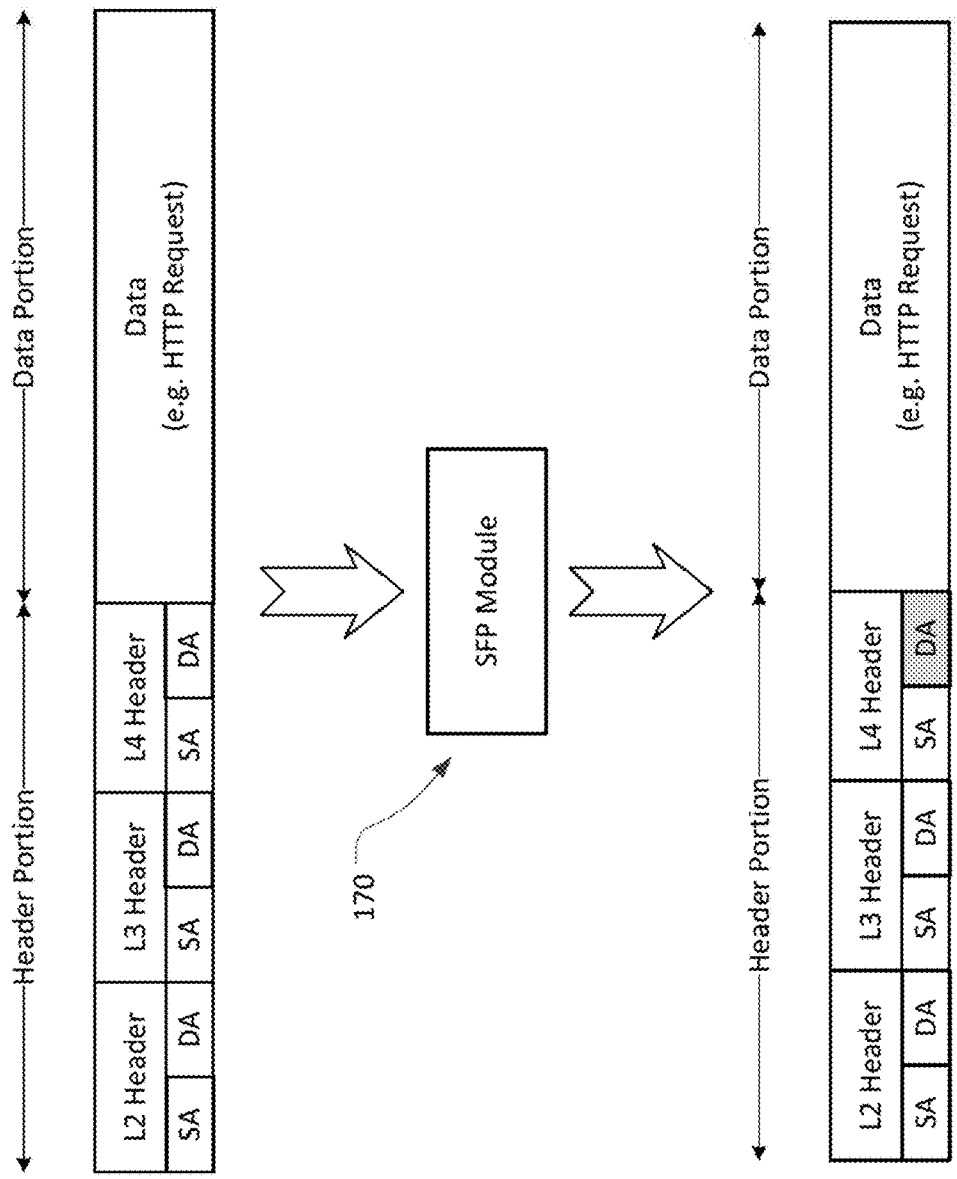

In FIG. 5D, the data packet is similar to the data packet shown in FIG. 5A or 5C. In this case however, upon inspecting part of the data portion of the data packet, the smart SEP module 170 modifies the destination port (DA) (e.g. TCP or UDP destination port) of the L4 header (e.g. TCP or UDP header) comprised in the header portion of the data packet. Such a modification may cause the data packet to be sent to the destination equipment albeit to a different port of that equipment.

Figure 5E:
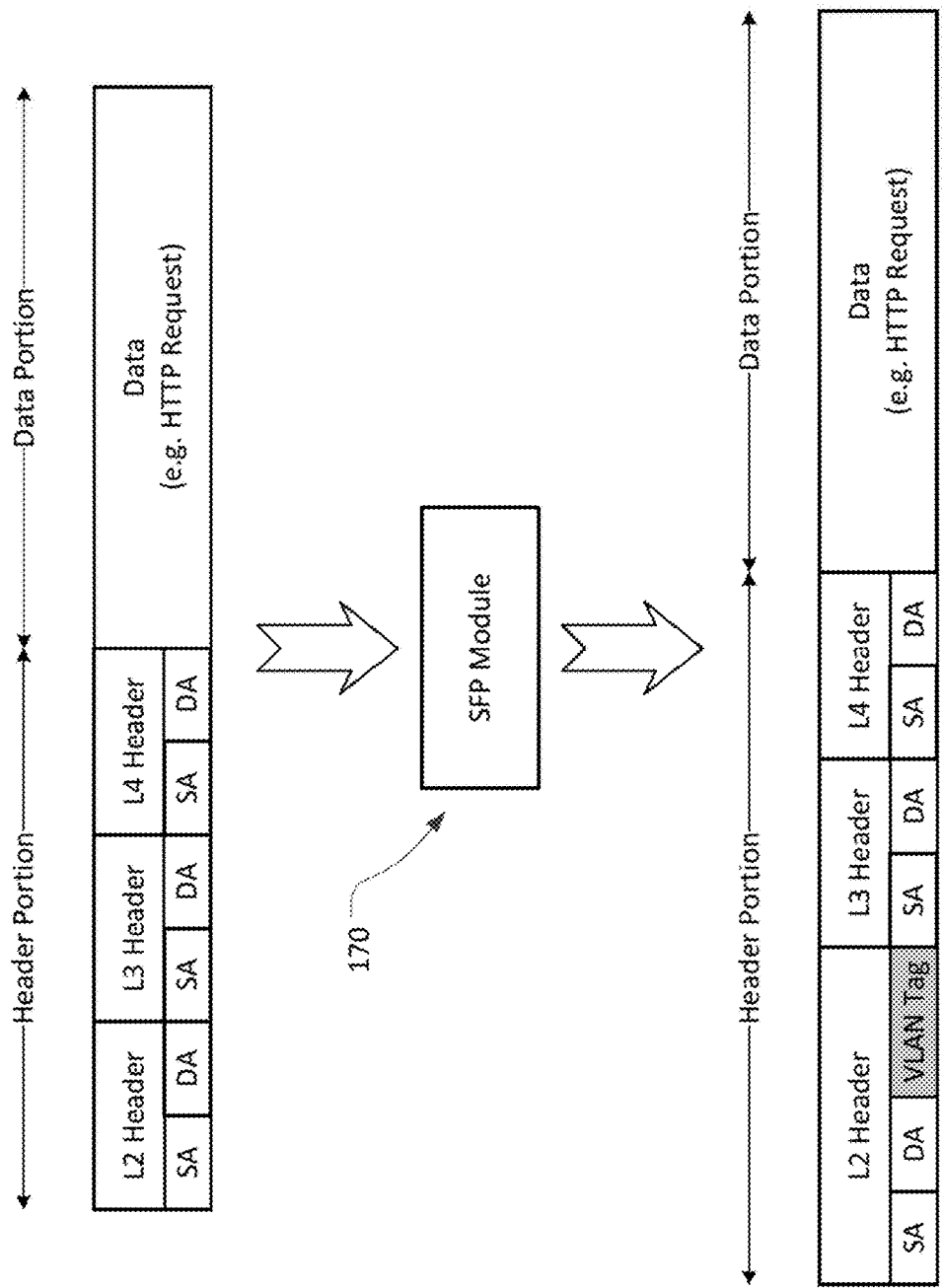

In FIG. 5E, upon inspecting part of the data portion of the data packet, the smart SFP module 170 adds a virtual local area network (VLAN) tag into the L2 header comprised in the header portion of the data packet. In this case, adding such a VLAN tag to the L2 header may cause the data packet to be sent toward a particular sub-network by the receiving networking equipment. Notably, modifying an existing VLAN tag, as in the example of FIG. 5B, will generally cause the data packet to be sent to a different VLAN, whereas adding a VLAN tag, as in the example of FIG. 5E, will generally cause the data packet to become associated with a VLAN with which the data packet was initially not associated.

Figure 5F:
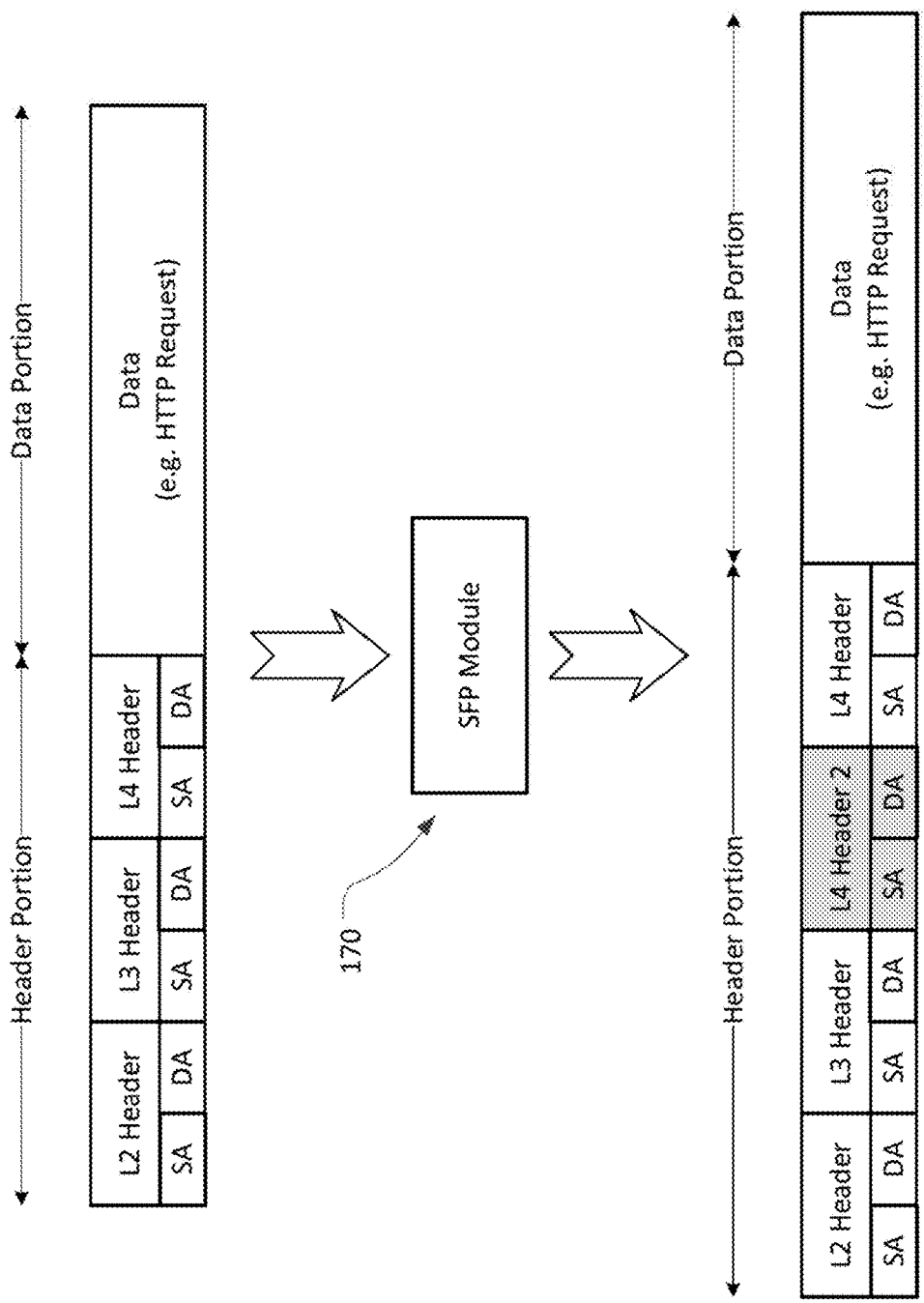

In the example illustrated in FIG. 5F, upon inspecting part of the data portion of the data packet, the smart SFP module 170 adds another L4 header in the header portion of the data packet. In this example, the additional L4 header is inserted between the existing L3 and L4 headers. Inserting such an additional L4 header into the header portion of the data packet may cause the data packet to be sent first to a different port on the destination equipment using the inserted L4 header, before the destination equipment further forwards the packet to the initially intended port using the existing L4 header.

Notably, in the previous examples (i.e. examples of FIGS. 5A to 5F), the communication network within which the modified data packets may travel may be limited to a private communication network (e.g. a local network, a data center, etc.). In that regard, the modifications to the header portion of the data packets may involve artificial or non-standard modifications in the sense that these modifications make sense only for local networking equipments in the private communication network.

Figure 5G:
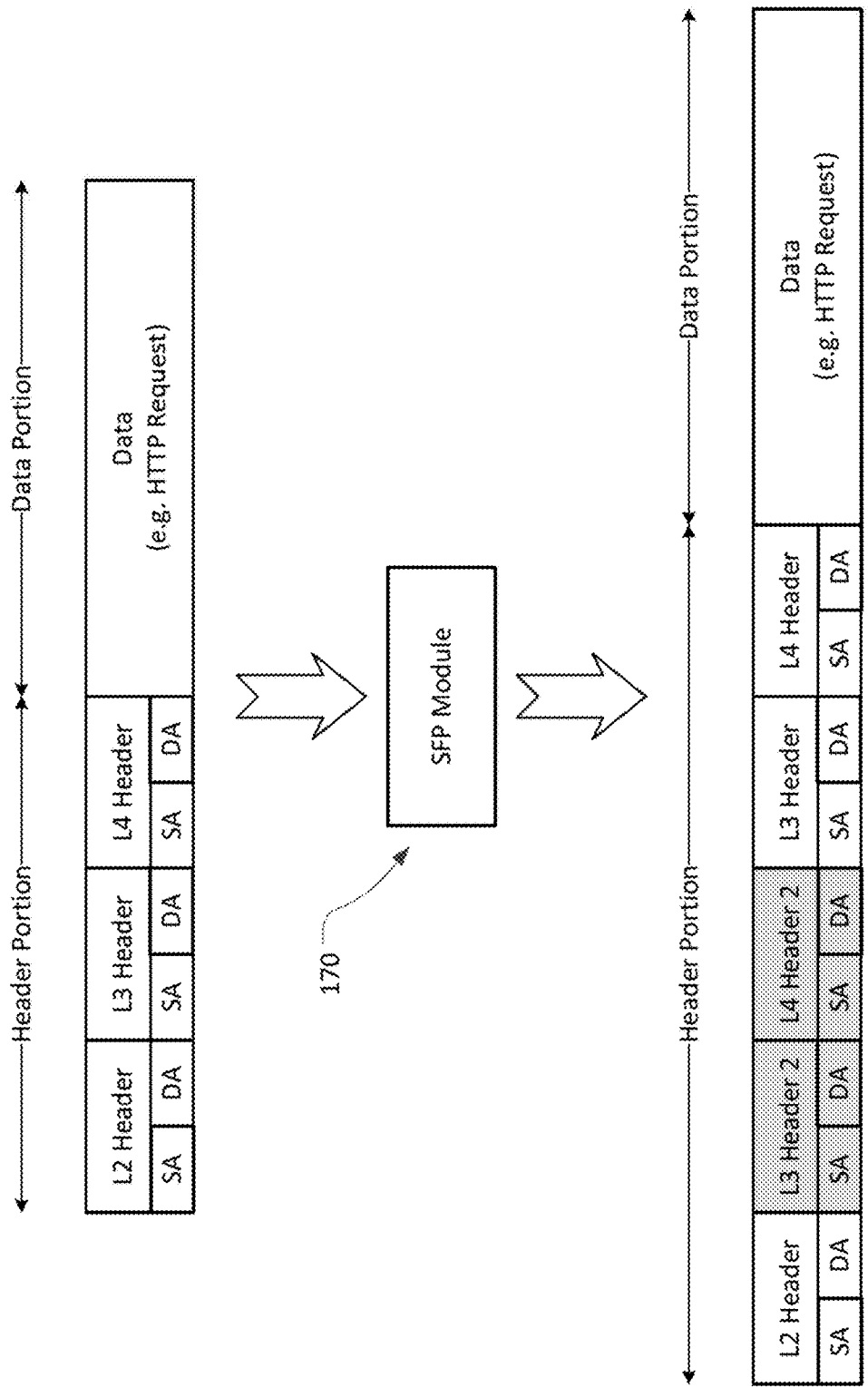

In the example of FIG. 5G, upon inspecting part of the data portion of the data packet, the smart SFP module 170 adds two headers in the header portion of the data packet. More particularly, in the illustrated example, a combination of L3 and L4 headers are added in the header portion of the data packet. In the illustrated example, the additional L3 and L4 headers are inserted between the existing L2 and L3 headers. Inserting such additional L3 and L4 headers into the header portion of the data packet may cause the data packet to be sent first to a specific port on a specific destination equipment using the inserted L3 and L4 headers, before being subsequently forwarded to the initially intended port on the initially intended destination equipment using the existing L3 and L4 headers.

Figure 5H:
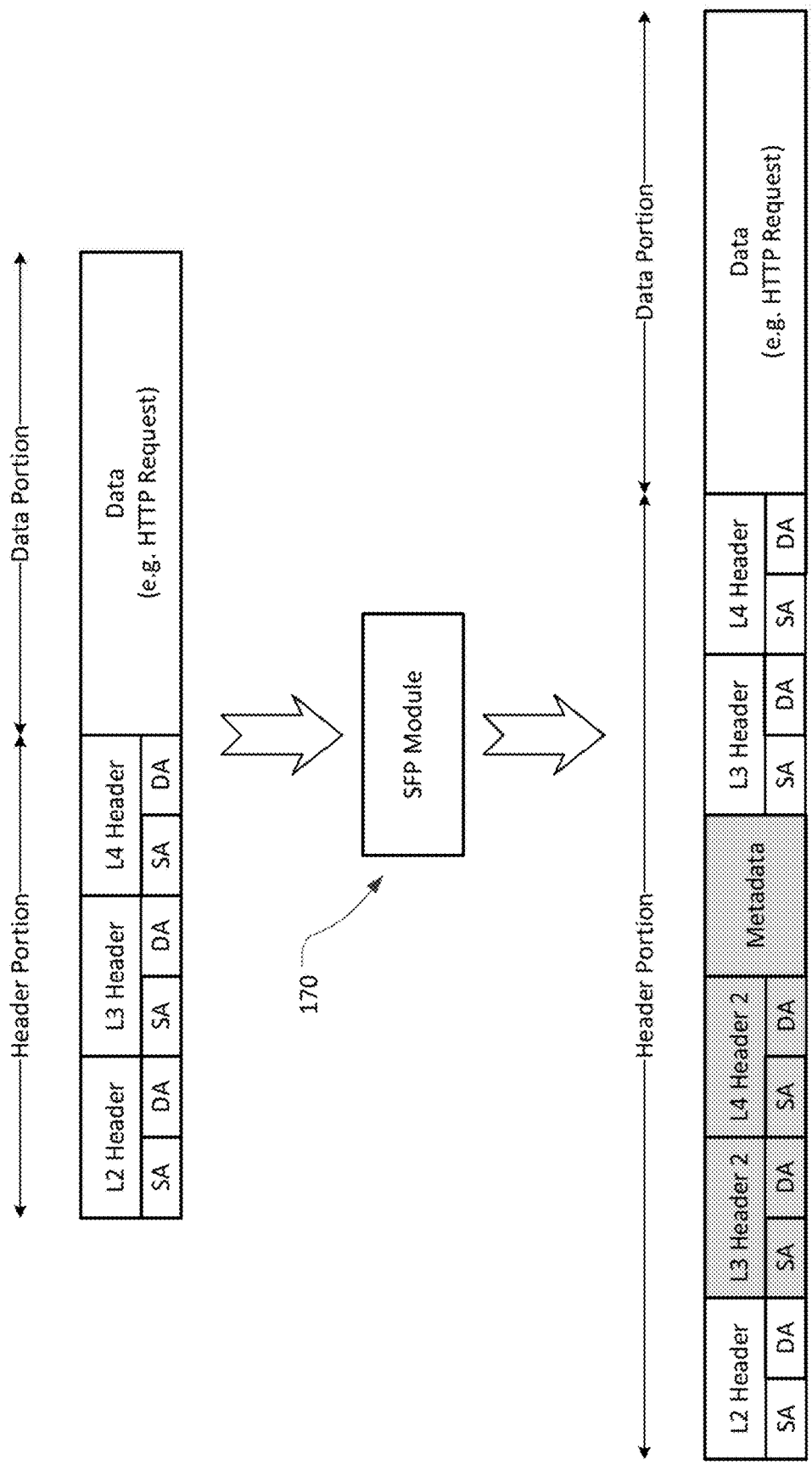

Finally, in the example illustrated in FIG. 5H, upon inspecting part of the data portion of the data packet, the smart SFP module 170 adds in the header portion of the data packet a combination of L3 and L4 headers, as in the example of FIG. 5G, plus metadata generated by the smart SFP module 170. In the illustrated example, the additional L3 and L4 headers and metadata are inserted between the existing L2 and L3 headers. As mentioned for the example of FIG. 5G, inserting additional L3 and L4 headers into the header portion of the data packet may cause the data packet to be sent first to a specific port on a specific destination equipment using the inserted L3 and L4 headers, before being subsequently forwarded to the initially intended port on the initially intended destination equipment using the existing L3 and L4 headers. For its part, the metadata may be any additional data that may be relevant for the specific destination equipment. For instance, the metadata may be the location of a particular character string within the inspected data portion of the data packet so that the destination equipment receiving the modified data packet according to the inserted L3 and L4 headers can quickly parse the data portion of the packet to retrieve the particular string.

It will be appreciated that in the previous two examples (i.e. FIGS. 5G and 5H), the modified data packets may travel through a public network (e.g. the Internet) since they are provided with conventional L3 and L4 headers.

To minimize latency due to packet processing within the smart SFP modules 170, header modification of a given data packet is generally performed in response to the partial inspection of the data portion of the given packet data. However, as a data packet has been processed, the smart SFP module 170 may further inspect the remaining uninspected portion of the data portion of the data packet as the data packet is forwarded either to the transceiver or to the receiving networking equipment. In such cases, the additional information that may be retrieved by this additional inspection may be added as metadata to a subsequent data packet having the same destination. Hence, when both partial and complete inspections are performed on a given data packet by the smart SFP module 170, metadata generated in response to the partial inspection may be added to the header portion of the given data packet while metadata generated in response to the remaining inspection may be added to the header portion of the next data packet going to the same destination as the given data packet. Understandably, when metadata generated in response to both partial and complete inspections are transmitted over multiple data packets, the networking equipment responsible for processing these metadata would be configured to reassemble the various metadata.

In order to determine the proper modification to apply to the header portion of a received data packet, the smart SFP module 170 may rely on a mapping table providing the applicable modification as a function of predetermined information detected or otherwise retrieved from at least part of the data portion of the data packet upon inspection. In that sense, in some embodiments, the modification may be specific in that given predetermined information may map to a specific destination address or port irrespective of the original destination address or port. In other embodiments, the modification may be relative in that given predetermined information may map to a mathematical relation to apply to the original destination address or port such that the modified destination address or port is mathematically related to the original destination address or port.

Various types of information detected or otherwise retrieved could lead to different modifications to the header portion of the data packet. For example, upon retrieving the particular application to which a data packet is addressed (e.g. a video service identified in a HTTP request), the smart SFP module 170 may look into its mapping table to retrieve the particular modification to apply for the given application. In such a case, the modification may involve modifying the destination address of the L3 header and/or of the L4 header such that the data packet is routed to a different equipment (e.g. a video server) (see also FIG. 5C).

In another example, the mapping table may comprise one or more character strings (e.g. key words) upon the detection of which in at least part of the data portion of the data packet, the smart SFP module 170 inserts new L3 and L4 headers and metadata into the header portion of the data packet. In such a scenario, the key words could be specific words related to illicit activities (e.g. drug trafficking, terrorism, etc.), the new L3 and L4 headers could comprise the destination address and port of a law enforcement monitoring equipment and the metadata could be the location of the word or words in the data portion of the data packet such that the receiving equipment can easily parse the modified packet to retrieve the flagged key words.

Understandably, the type of information detected or otherwise retrieved during the inspection of at least part of the data portion of the data packet may warrant different modifications of the header portion thereof. In that sense, in some embodiments, inspection of at least part of the data portion of the data packet may result in no modification to the header portion of the data packet.

Turning now to FIG. 6, an example of a mapping table 600 that can be used by the smart SFP module 170 to effect header modification is illustrated.

The mapping table 600, which can be stored in memory 240, generally comprises the information which triggers the modification, and the applicable modification to be performed to the header portion if the listed information is detected in the inspected part of the data packet. For instance, in the first line of table 600, when the smart SFP module 170 detects in the inspected portion of the data portion of the data packet the protocol "HTTP" and the string "GET" in addition to a destination port equal to "80", the smart SFP module 170 modifies the header information to add a L3 header (i.e. IP header) with destination IP address "192.168.4.10", and a new L4 header with destination port "8080". As such, the data packet will now be routed toward port "8080" on the networking equipment having IP address "192.168.4.10".

It will be appreciated that a modification to header portion of a data packet is generally reversible. In that sense, the mapping table 600 generally comprises a reverse or complementary header portion modification. For instance, the second line of table 600 shows that when the smart SFP module 170 detects that an incoming data packet has a source IP address of "192.168.4.10", the smart SFP module 170 must strip the data packet of the additional L3 and L4 headers.

The third and fourth lines of table 600 illustrate another example of header portion modification. In this example, when the smart SFP module 170 detects in the inspected portion of the data portion of the data packet the protocol "HTTP" and the string "POST" in addition to a destination port equal to "8080" and a VLAN1 address lower then 5001, the smart SFP module 170 modifies the header information to add 5000 to the VLAN1 address. For instance, if the initial VLAN1 address was "56", the modified VLAN1 address will be "5056".

Conversely, when the smart SFP module 170 detects a data packet with a VLAN1 address above 5001, the smart SFP module 170 deduces 5000 from the detected VLAN1 address. In the above example, if the smart SFP module 170 detects a VLAN1 address of "5056", it will deduce 5000 from the VLAN1 address such that the VLAN1 address will become "56".

Finally, the last line of table 600 contains the default header modification which in this case is no modification.

It will be appreciated that two smart SFP modules 170 may have different mapping tables and that any given mapping table may comprise more or less header portion modifications rules.

Figure 7:
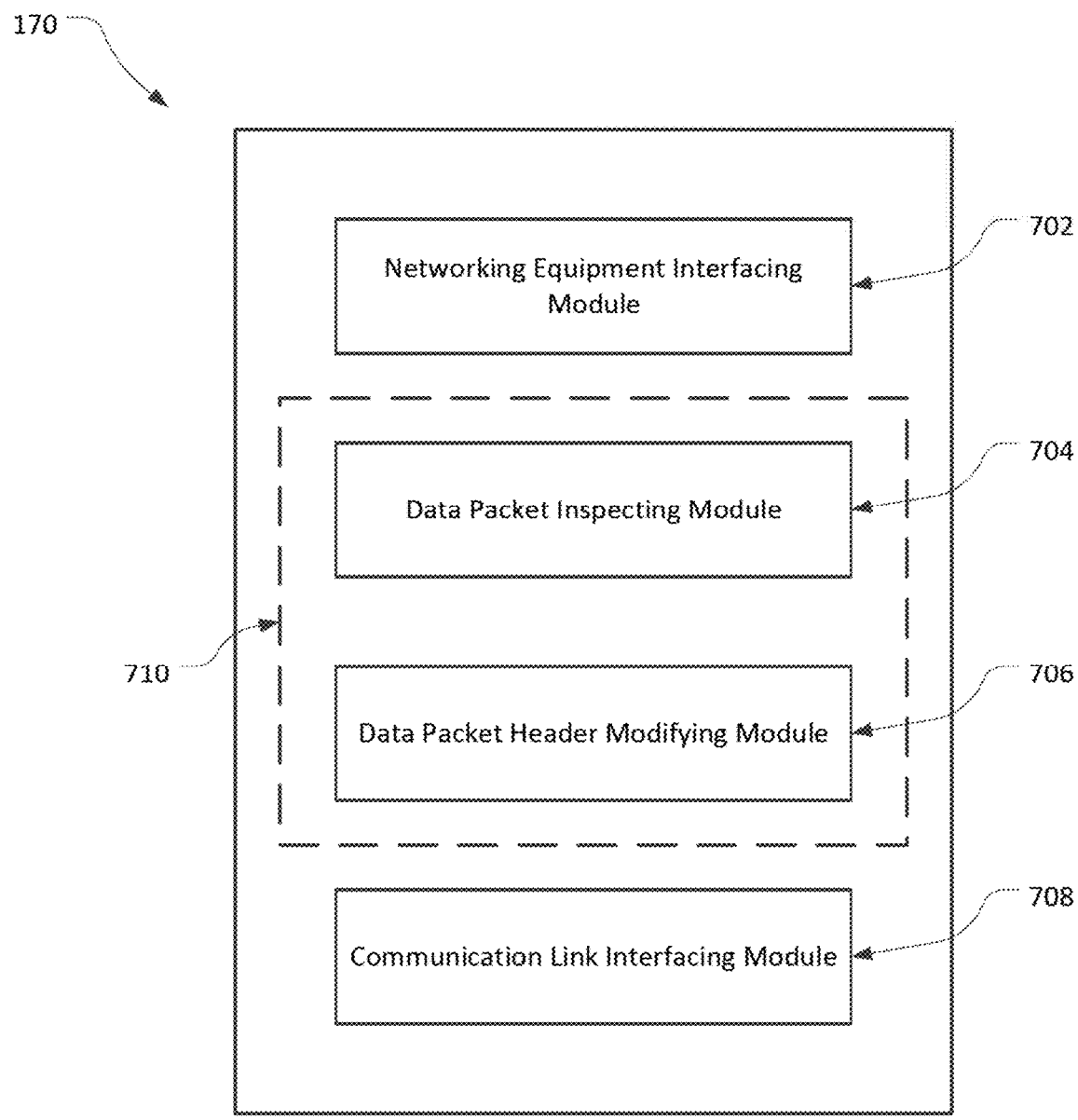
FIG. 7 illustrates a block diagram of another embodiment of a SFP module in accordance with the principles of the present invention.

Referring now to FIG. 7, another embodiment of a smart SFP module 170 in accordance with the principles of the present invention is illustrated.

The smart SFP module 170 may comprise a networking equipment interfacing module 702 configured to interface with a networking equipment, a data packet inspecting module 704 configured to inspect at least part of the data portion of a received data packet, a data packet header modifying module 706 configured to selectively modify the header portion of the data packet in response to the inspection of at least part of the data portion of the data packet by the data packet inspecting module, and a communication link interfacing module 708 configured to interface a communication link. In some embodiments, the data packet inspecting module 704 and the data packet header modifying module 706 may be collectively referred to as a packet processing module 710. As such, packet processing module 710 is generally responsible for modifying the header portion of the received data packet in response to inspecting at least part of the data portion thereof.

Embodiments of the invention may be represented as a software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine-readable medium may interface with circuitry to perform the described tasks.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method of operating a small form factor pluggable, SFP, module in a communication network, the method comprising:
   receiving a data packet from a first networking equipment, the data packet being configured for reception by a first type of networking equipment and the data packet comprising a header portion and a data portion;
   partially inspecting the data portion of the data packet;
   detecting predetermined information from the inspected part of the data portion of the data packet;
   using a mapping table stored in a memory of the SFP to associate a header modification rule with the detected predetermined information;
   modifying the header portion of the data packet based upon the header modification rule associated with the predetermined information in the mapping table, the modification to the header portion configuring the data packet for reception by a second type of networking equipment; and forwarding the modified data packet to a second networking equipment.

2. A method as claimed in claim 1, wherein modifying the header portion of the data packet comprises modifying addressing information comprised in the header portion.

3. A method as claimed in claim 2, wherein modifying the addressing information comprises reversibly modifying the addressing information.

4. A method as claimed in claim 2, wherein modifying the addressing information comprises modifying a destination address comprised in the addressing information.

5. A method as claimed in claim 1, wherein the header portion of the data packet comprises a plurality of headers, and wherein modifying the header portion of the data packet comprises modifying at least one of the plurality of headers.

6. A method as claimed in claim 5, wherein modifying at least one of the plurality of headers comprises modifying a destination address of the at least one of the plurality of headers.

7. A method as claimed in claim 5, wherein modifying at least one of the plurality of headers comprises inserting at least one additional header within at least one of the plurality of headers.

8. A method as claimed in claim 1, wherein the header portion of the data packet comprises a plurality of headers, and wherein modifying the header portion of the data packet comprises inserting at least one additional header to the plurality of headers.

9. A method as claimed in claim 1, wherein the header portion of the data packet comprises a plurality of headers, and wherein modifying the header portion of the data packet comprises inserting at least one additional header and metadata to the plurality of headers.

10. A small form factor pluggable, SFP, module for use in a communication network, the SFP module being pluggable into a networking equipment, the SFP module comprising:
    a first communication interface configured to be in communication with the networking equipment;
    a second communication interface configured to interface a communication link; and
    circuitry operatively connected to the first and second communication interfaces, the circuitry being configured for:
        receiving a data packet either from the networking equipment, via the first communication interface, or from the communication link, via the second communication interface, the data packet being configured for reception by a first type of networking equipment and comprising a header portion and a data portion;
        partially inspecting the data portion of the data packet;
        detecting predetermined information from the inspected part of the data portion of the data packet;
        using a mapping table stored in a memory of the SFP to associate a header modification rule with the detected predetermined information;
        modifying the header portion of the data packet based upon the header modification rule associated with the predetermined information in the mapping table, the modification to the header portion configuring the data packet for reception by a second type of networking equipment; and
        forwarding the modified data packet either to the communication link, via the second communication interface, if the data packet was received from the networking equipment, or to the networking equipment, via the first communication interface, if the data packet was received from the communication link.

11. A SFP module as claimed in claim 10, wherein modifying the header portion of the data packet comprises modifying addressing information comprised in the header portion.

12. A SFP module as claimed in claim 11, wherein modifying the addressing information comprises reversibly modifying the addressing information.

13. A SFP module as claimed in claim 11, wherein modifying the addressing information comprises modifying a destination address comprised in the addressing information.

14. A SFP module as claimed in claim 10, wherein the header portion of the data packet comprises a plurality of headers, and wherein modifying the header portion of the data packet comprises modifying at least one of the plurality of headers.

15. A SFP module as claimed in claim 14, wherein modifying at least one of the plurality of headers comprises modifying a destination address of the at least one of the plurality of headers.

16. A SFP module as claimed in claim 14, wherein modifying at least one of the plurality of headers comprises inserting at least one additional header within at least one of the plurality of headers.

17. A SFP module as claimed in claim 10, wherein the header portion of the data packet comprises a plurality of headers, and wherein modifying the header portion of the data packet comprises inserting at least one additional header to the plurality of headers.

18. A SFP module as claimed in claim 10, wherein the header portion of the data packet comprises a plurality of headers, and wherein modifying the header portion of the data packet comprises inserting at least one additional header and metadata to the plurality of headers.

19. A SFP module as claimed in claim 10, wherein the first communication interface is a SFP-compliant communication interface.

20. A SFP module as claimed in claim 10, wherein the second communication interface comprises an optical transceiver.

21. A SFP module as claimed in claim 10, wherein the second communication interface comprises an electrical transceiver.

* * * * *